United States Patent

Na

(10) Patent No.: US 6,828,744 B2
(45) Date of Patent: Dec. 7, 2004

(54) MOTOR TORQUE CONTROL APPARATUS AND METHOD

(75) Inventor: Seung-Ho Na, Seoul (KR)

(73) Assignee: LG Industrial Systems Co., Ltd., Seoul (KR)

(*) Notice: Subject to any disclaimer, the term of this patent is extended or adjusted under 35 U.S.C. 154(b) by 0 days.

(21) Appl. No.: 10/370,707

(22) Filed: Feb. 24, 2003

(65) Prior Publication Data

US 2003/0160585 A1 Aug. 28, 2003

(30) Foreign Application Priority Data

Feb. 26, 2002 (KR) .................... 10-2002-0010302

(51) Int. Cl.$^7$ ............. H02P 7/00; H02P 5/28; H02P 5/34
(52) U.S. Cl. .......... 318/432; 318/700; 318/801; 318/807; 318/814
(58) Field of Search .................. 318/700, 727, 318/432, 800, 801, 804, 805, 807, 811, 814

(56) References Cited

U.S. PATENT DOCUMENTS

| | | | | |
|---|---|---|---|---|
| 4,680,526 A | * | 7/1987 | Okuyama et al. | 318/802 |
| 5,965,995 A | * | 10/1999 | Seibel et al. | 318/805 |
| 6,009,003 A | * | 12/1999 | Yeo | 363/37 |
| 6,075,337 A | * | 6/2000 | Ishii et al. | 318/801 |
| 6,229,719 B1 | * | 5/2001 | Sakai et al. | 363/37 |
| 6,518,722 B1 | * | 2/2003 | Giuseppe | 318/727 |
| 6,528,966 B2 | * | 3/2003 | Na | 318/727 |
| 6,611,124 B2 | * | 8/2003 | Ishida | 318/727 |
| 6,647,329 B2 | * | 11/2003 | Kleinau et al. | 701/41 |

\* cited by examiner

*Primary Examiner*—Rina Duda
*Assistant Examiner*—Patrick Miller
(74) *Attorney, Agent, or Firm*—Greenblum & Bernstein P.L.C.

(57) ABSTRACT

A motor torque control apparatus and method are disclosed. By adding the value of the compensation voltage which is obtained by proportionally integrating a difference value between the predetermined reference magnetic flux component current value and the actually measured magnetic flux component current value to the q-axis instructing voltage, the magnetic flux component current, that is, the excitation current, can be constantly controlled without excess or shortage. In addition, since the magnetic flux is constantly controlled irrespective of the speed of the motor, a high torque can be generated even at the initial stage of starting of the motor (at the low speed), and thus, the torque of the motor can be smoothly controlled in every operation range from a low speed to a high speed.

6 Claims, 3 Drawing Sheets

MOTOR TORQUE CONTROL APPARATUS AND METHOD

BACKGROUND OF THE INVENTION

1. Field of the Invention

The present invention relates to a motor and, more particularly, to an apparatus and method for controlling torque of a motor.

2. Description of the Background Art

In general, a conventional apparatus and method for controlling a torque of a motor controls a torque of a motor in such a manner that a voltage value obtained by multiplying a ratio between a rated voltage simply supplied to a motor scalarly and a rated frequency by a speed instruction value expressed as a frequency and a voltage drop value according to a resistance of a stator of the motor are added, and a voltage corresponding to the added value is outputted to the motor to thereby control a torque of the motor.

The voltage drop value is obtained by multiplying a stator resistance value of the motor and a value of a current flowing at the stator resistance. However, with this control method, motor starting is not easy according to an operation form such as a speed of the motor or a load capacity applied to the motor.

The apparatus and method for controlling a torque of a motor in accordance with the conventional art will now be described with reference to FIGS. 1 to 3C.

Figure 1:
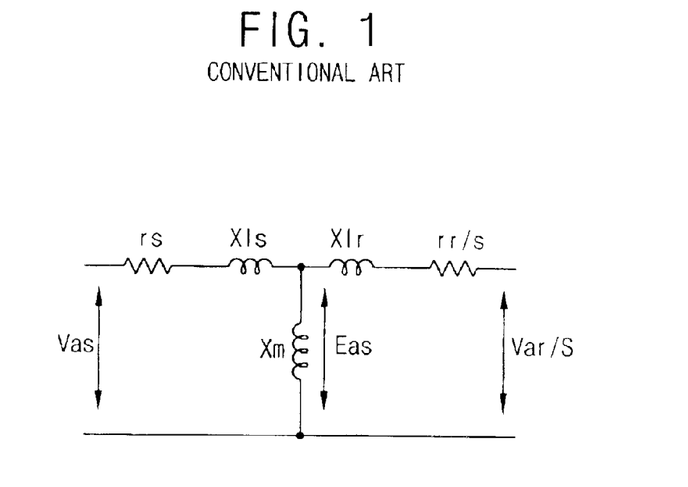
FIG. 1 illustrates an equivalent circuit of a general induction motor.

FIG. 1 illustrates an equivalent circuit of a general induction motor.

As shown in FIG. 1, the equivalent circuit of the induction motor includes a resistance (rs) and inductors (Xls, Xm) constituting a voltage loop for an input voltage Vas; and inductors (Xlr, Xm) and a resistance (rr/S) constituting a voltage loop for an output voltage (Vas/S).

That is, when a speed of the induction motor is controlled by making a radio between the input voltage (Vas) and a frequency (F) to be constant, the resistance (rs) has a constant value because it is a parameter irrespective of the frequency, whereas inductance of the inductors (Xm, Xls) is varied in proportion to the frequency. At this time, the relation between the inductance and the frequency is defined by the following equation (1):

$$Xls = 2\pi \times F \times lls, Xm = 2\pi \times F \times lm \quad (1)$$

wherein IIs and Im are values of current flowing at each inductor (Xls, Xm), and 'F' is a frequency.

As noted in equation (1), when the ratio between voltage and frequency is made constant and the frequency is lowered down, a voltage (Eas) applied to the inductor (Xm) is reduced and an excitation current flowing at the inductor (Xm) is also reduced, so that an output torque of the induction motor is reduced. The output torque (T) of the induction motor is defined by the following equation (2):

$$T = k \times I_m \times I_t \quad (2)$$

wherein 'k' is a constant, $I_m$ is an excitation current value, and $I_t$ is a torque component current value generating a torque.

In case of driving the induction motor by using the defined output torque (T), a torque should be suitably controlled according to conditions of a load applied to the induction motor.

For instance, when an elevator is full with passengers in a stop state, if a motor is initiated for an ascending operation, a torque boost voltage should be additionally applied to the motor in order to output more torque than the torque as shown in equation (2) because much torque is necessary at the initial stage of starting. In this respect, however, if the torque boost voltage is increased more than necessary, an over excitation current is generated to damage the motor and the inverter electrically connected to the motor may be damaged due to the overcurrent.

On the other hand, if the torque boost voltage is in short supply, the output torque of the motor is not enough to initiate the motor and ascent the elevator.

At this time, in case that a standard motor is operated by an inverter, since a voltage (V) is varied in proportion to the variation of the output frequency (F), a voltage drop is much increased in a low frequency domain and a torque generated from the motor is very small compared to a torque of a commercial electric power supply. Therefore, a voltage for compensating the shortage of the output torque of the motor by increasing voltage suitable to the voltage drop in the low frequency domain is called the torque boost voltage.

The motor torque control apparatus in accordance with the conventional art will now be described with reference to FIG. 2.

Figure 2:
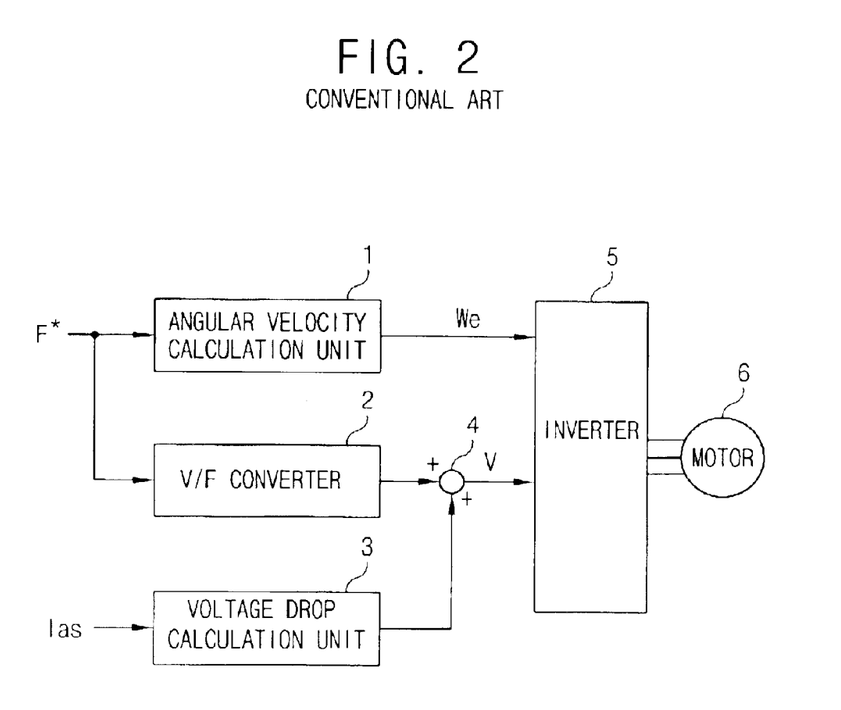
FIG. 2 shows the construction of a motor torque control apparatus in accordance with a conventional art.

As shown in FIG. 2, the conventional motor torque control apparatus includes: an angular velocity calculation unit 1 for calculating a radian frequency (We) on the basis of a goal frequency (in other words an output frequency) (F*) corresponding to a speed instruction value; a V/F converter 2 for receiving the previously stored goal frequency (F*) from a memory unit or from user's setting, converting the goal frequency (F*) into a voltage instruction value (V*) according to predetermined ratio (V/F) between an input frequency (F) and an input voltage (V) and outputting it; a voltage drop calculation unit 3 for receiving a current (Ias) flowing on a stator winding (referred to as 'stator') of the motor 6 from the previously stored memory unit or from a user's setting, and multiplying the inputted current value (Ias) and a stator resistance value (Rs) of the motor 6 to calculate a voltage drop value; an adder 4 for adding the voltage instruction value (V*) from the V/F converter 2 and the voltage drop value from the voltage drop calculation unit 3 and outputting it; and an inverter 5 for controlling an operation of the motor 6 according to the a radian frequency (We) and a voltage generated from the adder 4.

That is, the conventional motor torque control apparatus is constructed such that the voltage obtained by converting the goal frequency (F*) into the voltage instruction value (V*) by means of the V/F converter 2 is compensated with a voltage drop component according to the stator resistance of the motor 6 and the compensated voltage is applied to the inverter 5, thereby controlling the torque of the motor 6.

Figure 3A:
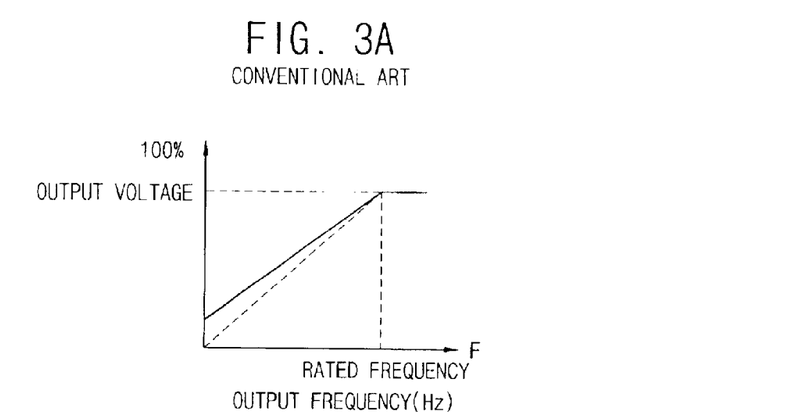
FIGS. 3A to 3C are graphs frequency-to-output voltages in comparison of a profile of frequency-to-output voltage and a profile of a boosted voltage according to a motor with an applied load.
Figure 3B:
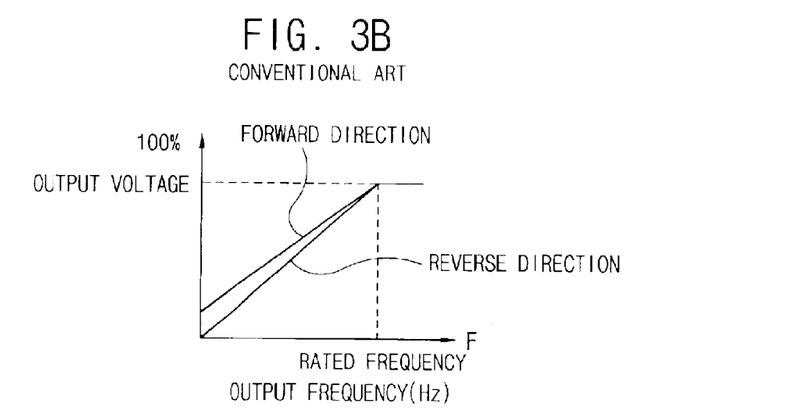
Figure 3C:
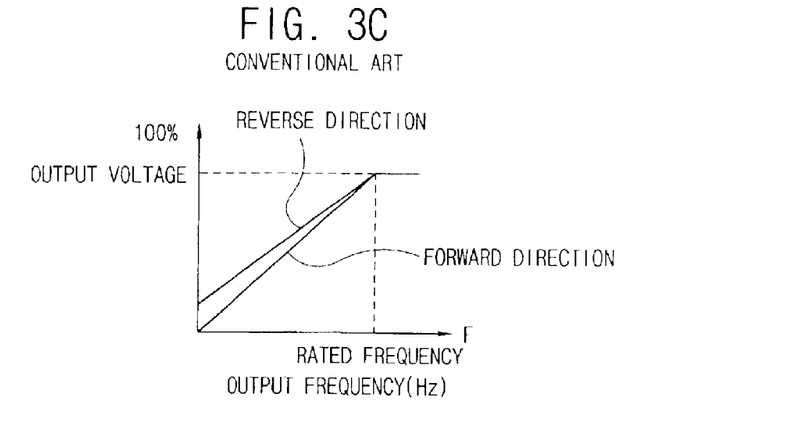

FIGS. 3A to 3C are graphs showing a V/F profile that a boosted instructing voltage is outputted to the motor according to a load applied to the motor and an operation direction in accordance with the conventional art.

For instance, if a rated voltage of a motor is 220V and a rated frequency is 50 Herz, a voltage-to-frequency ratio is 220/60, which is about 3.7. the conventional motor torque control apparatus supplies a instructing voltage to the motor through an inverter (in more detail, a pulse width modulator and switching devices) according to the voltage-to-frequency ratio.

FIG. 3A is a graph of a voltage-to-frequency profile applied to a conveyer or a small freight car driven by electricity, showing comparison between a torque boost quantity and an output voltage according to a certain voltage-to-frequency ratio. The conveyer or the electric-driven freight car refers to a load making a forward movement or a reverse movement in a horizontal direction, and when it moves forwardly or backwardly, the same torque is necessary. Thus, the conventional motor torque control apparatus outputs a instructing voltage according to a predetermined voltage-to-frequency ratio until it reaches a rated frequency of the motor equally in the forward movement and reverse movement of the load, which is the profile as shown by dotted lines in FIG. 3A.

However, because much torque is required in the initial starting (that is, in case of the low frequency with a low speed), actually, a instructing voltage like a profile as shown by a solid line in FIG. 3A is boosted and outputted, and when the motor is rotated with a frequency close to the rated frequency, that is, when the speed of the load approaches the rated speed, the boost voltage becomes small, and then when the motor reaches the rated frequency, the boost voltage becomes zero.

FIGS. 3B and 3C are graphs of a voltage-to-frequency profile for an ascending/descending load such as the elevator or a hoist, showing comparison between a torque boost quantity and an output voltage according to a predetermined voltage-to-frequency ratio.

In case of the ascending/descending load, much torque is not necessary for starting for operation in a descending direction, so that a torque boost of the motor, that is, a boost voltage, is not necessary.

Therefore, in case that a rotational direction of the motor to drive the ascending/descending load in the ascending direction is a forward direction, when the ascending/descending load ascends, a boost voltage greater than an output voltage according to a predetermined voltage-to-frequency ratio in the low frequency is added to output a instructing voltage, of which a voltage-to-frequency profile is like the upper profile in FIG. 3B. And, in case that a rotational direction of the motor to drive the ascending/descending load in the descending direction is a reverse direction, when the ascending/descending load descends, a boost voltage is not necessary, so that an output voltage is controlled by the output voltage according to the predetermined voltage-to-frequency ratio like the lower profile in FIG. 3B.

Meanwhile, when the rotational direction of the motor for driving the ascending/descending load in the ascending direction is a reverse direction, when the ascending/descending load ascends, a boost voltage greater than the output voltage according to the certain voltage-to-frequency ratio in the low frequency is added to output a instructing voltage, of which the voltage-to-frequency profile is like the upper profile of FIG. 3C. And when the ascending/descending load descends, that is, when the motor is driven in the forward direction, a boost voltage is not necessary, so that an output voltage is controlled by the output voltage according to the certain voltage-to-frequency ratio like the lower profile in FIG. 3C.

The conventional motor torque control method is a method for supplying an output voltage (V) calculated by the below equation (3), which rails to control constantly an excitation current of the current:

Output voltage $(V) = Rs \times Is + (\text{rated voltage}/\text{rated frequency}) \times \text{command frequency}$ (3)

wherein Rs is a stator resistance value of the motor and Is is a value of current flowing at the stator resistance of the motor.

That is, in the conventional motor torque control method, motor torque is controlled only on the basis of a voltage obtained by compensating a voltage corresponding to the rated voltage-to-rated frequency ratio with a voltage drop value according to the current flowing at the stator resistance.

Thus, as shown in FIGS. 3A to 3C, even if torque is controlled with a voltage obtained by adding the boost voltage to the output voltage, an excitation current of the actual motor can be excessive or in short supply. Therefore, the motor may be damaged by the excessive excitation current or a desired torque amount may not be generated due to the shortage of the excitation current.

In addition, in the conventional motor torque control apparatus and method, if a load capacity applied to the motor is greater than a motor torque according to the voltage command according to a predetermined voltage-to-frequency ratio or greater than a motor torque according to a boosted voltage command, the motor can not be started. That is, if the load applied to the motor is large, the motor is not started but simply vibrated by being rotated in the forward direction and in the reverse direction, not the direction desired by the motor, Moreover, in the conventional motor torque control apparatus and method, if the stator resistance value is inaccurate, it is not possible to accurately control a torque of the motor, for which, thus, a desired accurate stator resistance value should be measured and set.

SUMMARY OF THE INVENTION

Therefore, an object of the present invention is to provide a motor torque control apparatus and method that are capable of generating an optimum torque boost voltage regardless of a load capacity applied to the motor, and precisely and stably controlling a torque of the motor on the basis of the generated optimum boost voltage.

To achieve these and other advantages and in accordance with the purpose of the present invention, as embodied and broadly described herein, there is provided a motor torque control apparatus comprising: a frequency-to-voltage converter for converting a command frequency to a voltage value according to a predetermined rated voltage-to-rated frequency ratio of a motor and outputting it; a magnetic flux controller for outputting a compensation voltage to compensate a difference between a predetermined reference value of a magnetic flux component current and a measured actual magnetic flux component current value; a stator voltage drop calculator for receiving the measured actual torque component current value, calculating a voltage for compensating a voltage drop by the stator resistance of the motor and outputting it; an adder for summing output values of the magnetic flux controller, of the frequency-to-voltage converter and of the stator voltage drop calculator and outputting the summed value as a torque component command voltage; a magnetic flux component command voltage generator for receiving the value of the measured actual magnetic flux component current and the value of the actual torque component current, calculating and outputting a magnetic flux component command voltage; and an inverter for controlling the motor according to the torque component command voltage received from the adder and the magnetic flux component command voltage received from the magnetic flux component command voltage generator.

To achieve the above object, there is also provided a motor torque control method comprising the steps of: measuring a value of actual magnetic flux component current flowing at a motor; generating a compensation voltage for compensating a difference value between the measured actual magnetic component current value and a predetermined reference magnetic flux component current value; converting a command frequency into a corresponding voltage according to a predetermined ratio between a rated frequency and a rated voltage of the motor; calculating a voltage drop value according to a stator resistance of the motor by multiplying a stator resistance value of the motor by the measured actual torque component current value; summing a value of compensation voltage of the difference value, a value of voltage converted from the command frequency, and the voltage drop value, and generating a torque component command voltage value; generating a magnetic flux component command voltage value on the basis of the measured value of actual torque component current flowing at the motor, the measured value of actual magnetic flux component current flowing at the motor, the stator resistance value, an angular velocity obtained by multiplying the command frequency by 2π and a leakage reactance of the motor; and controlling a torque of the motor according to the torque component command voltage value and the magnetic flux component command voltage value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
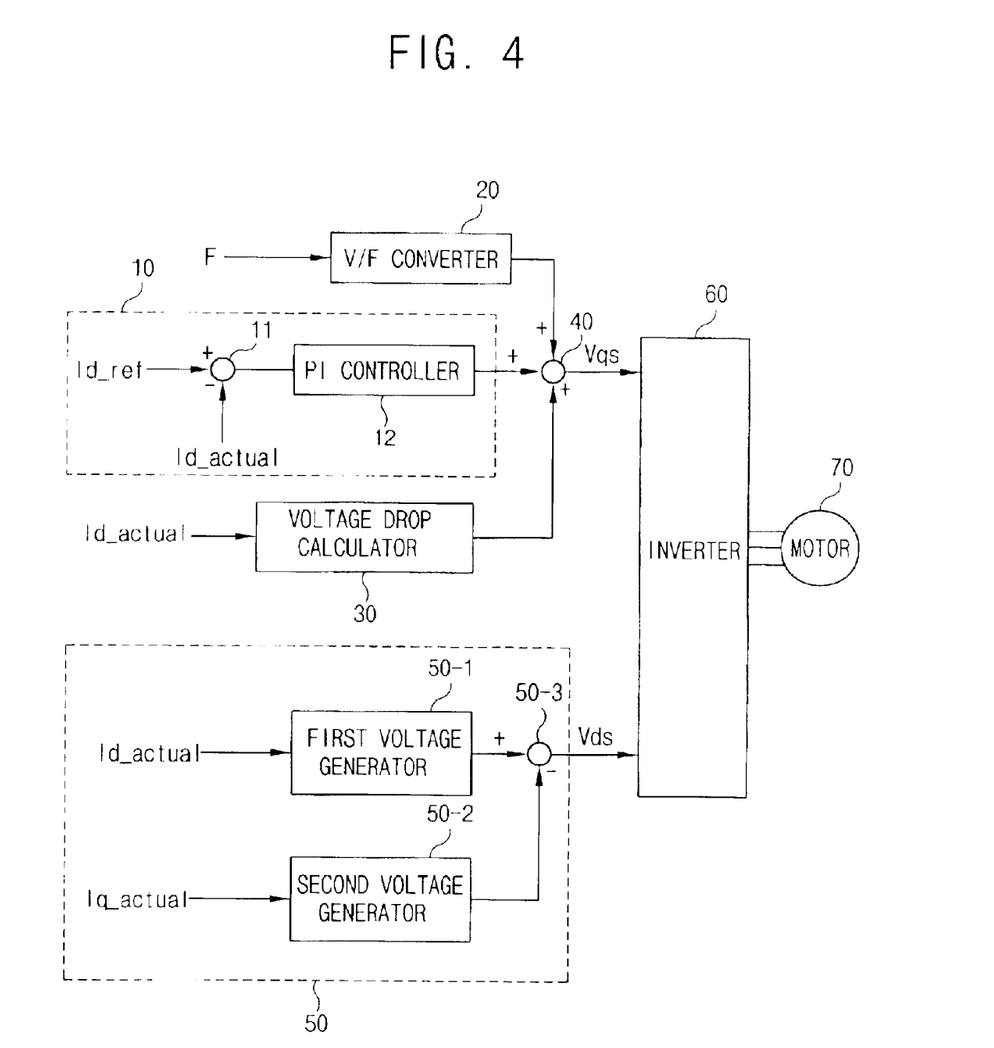
FIG. 4 is a motor torque control apparatus in accordance with the present invention.

FIG. 4 is a motor torque control apparatus in accordance with the present invention.

As shown in FIG. 4, a motor torque control apparatus including: a V/F converter 20 for converting a command frequency (that is, a goal speed) to a voltage value according to a predetermined rated voltage (V)-to-rated frequency (F) ratio (V/F ratio) of a motor 70 and outputting it; a magnetic flux controller 10 for outputting a compensation voltage to compensate a difference between a predetermined reference value (Id_ref) of a magnetic flux component current and a measured actual magnetic flux component current value (Id_actual); a stator voltage drop computing means (voltage drop calculator) 30 for receiving the measured actual torque component current value (Iq_actual), calculating a voltage for compensating a voltage drop by the stator resistance of the motor 70 and outputting it; an adder 40 for summing output values of the magnetic flux controller 10, of the V/F converter 20 and of the stator voltage drop computing means 30 and outputting the summed value as a torque component command voltage (abbreviated as a q-axis command voltage) (Vq); a magnetic flux component command voltage generator for receiving the value of the measured actual magnetic flux component current (Id_actual) and the value of the actual torque component current (Iq_actual), calculating and outputting a magnetic flux component command voltage (abbreviated as a d-axis command voltage) (Vd); and an inverter 60 for controlling the motor 70 according to the q-axis command voltage (Vq) received from the adder 40 and the d-axis command voltage (Vd) received from the magnetic flux component command voltage generator 50.

The predetermined V/F ratio is a ratio obtained by dividing a predetermined rated voltage (for example AC 220 V) for each motor 70 by a rated frequency (for example 50 Hertz), which is previously calculated and stored.

The magnetic flux component current for one motor is to be a predetermined value, but since it is varied actually, a difference is compensated by comparing a predetermined reference value with an actual measured value. The value of actual magnetic flux component current (Id_actual) and the value (Iq_actual) of actual torque component current are measured in the following manner.

That is, a current transformer (CT) is installed on each phase line of three phase AC output lines connected from the inverter 60 to the motor 70 to measure the three phase current flowing at the motor 70. The value of the three phase AC current outputted after being measured by the transformer is converted to a value of two phase current by a 3 phase/2 phase converter, thereby obtaining an actual magnetic component current value and an actual torque component current value.

Here, the three phase/two phase converter converts the three phase current to the two phase current value by using a predetermined well known computation formula and provides it to the torque control apparatus of the present invention. The transformer and the 3 phase/2 phase converter are not shown in drawings.

The motor torque control apparatus of the present invention can be manufactured as one inverter but the above mentioned inverter specially can be regarded as only a 3 phase switching means (generally, it is constructed as a pair of power transistors for each phase) for supplying three phase AC current to the motor by switching and as a pulse width modulator for receiving the q-axis instructing voltage (Vq) and the d-axis instructing voltage (Vd) and providing a pulse width modulation signal as a signal for controlling switching of the switching means to the switching means.

The magnetic flux controller 10 comprises: a subtracter 11 for obtaining a difference between the value (Id_actual) of actual magnetic flux component current supplied to the motor 70 and a value of predetermined reference magnetic flux component current (Id_ref); and a proportional integration controller (abbreviated as 'PI') 12 for proportionally integrating the difference value received from the subtracter 11 and outputting a compensation voltage to make the actual magnetic flux component current (Id_actual) and the reference magnetic flux component current (Id_ref) to be the same.

The magnetic flux component command voltage generator 50 comprises: a first voltage generator 50-1 for receiving the value of actual magnetic flux component current (Id_actual) multiplying a predetermined stator resistance value by the value of actual magnetic flux component current (Id_actual), and generating and outputting a first voltage; a second voltage generator 50-2 for receiving the value of actual torque component current (Iq_actual), multiplying the value of actual torque component current by a value obtained by multiplying an angular velocity (We) and a leakage reactance (δLs) of the motor 70, and generating and outputting a second voltage; and a subtracter (50-3) for subtracting the second voltage value outputted from the second voltage generator 50-2 from the first voltage value outputted from the first voltage generator 50-1, and outputting the result value as a magnetic flux component command voltage value (Vds).

The predetermined stator resistance value is previously measured and stored. The angular velocity (We) is a value provided after being calculated by using well known formula We=2π f ('f' is the command frequency (F) and a calculation means is not shown). The leakage reactance (δLs) is a predetermined inherent value for each motor. That is, leakage reactance (δLs) is a previously stored value after obtained by computing by using a predetermined computation formula (to be described) and reactance values of stator and rotor and/or mutual reactance values previously measured for each motor.

The operation of the motor torque control apparatus in accordance with the present invention will now be described in detail.

First, the subtracter 11 of the magnetic flux controller 10 compares the value of actual magnetic flux component current (Id_actual) flowing on the motor 70 as obtained by converting the three phase current detected by the current transformer calculates into two phase current through the three phase/two phase converter with the predetermined reference magnetic flux component current value (Id_ref), calculates a difference value between the actual current value (Id_actual) and the reference current (Id_ref) value, and outputs the calculated result value to the PI controller 12 of the magnetic flux controller 10.

The PI controller 12 proportionally integrates the difference value calculated by the subtracter 11 and outputs a compensation voltage to make the value (Id_actual) of the actual magnetic flux component current and the predetermined reference magnetic flux component current value (Id_ref) to be the same to each other to the adder 40.

The V/F converter 20 converts the command frequency (F) for commanding a speed of the motor 70 to a voltage value according to a predetermined V/F ratio and outputs it to the adder 40.

At this time, the voltage drop computing means 30 obtains a voltage drop value by multiplying the predetermined and stored stator resistance value (Rs) by the value of actual torque component current (Id_actual) flowing on the motor 70 which has been obtained by converting the three phase current detected by the transformer into two phase current through the three phase/two phase converter, and outputs the obtained voltage drop value as a compensation voltage value to the adder 40.

The adder 40 sums all the magnetic flux component current compensation voltage value received from the PI controller 12, the frequency-to-voltage converted value received from the V/F converter 20, and the voltage drop value received from the voltage drop computing means 30, and outputs the summed value as a q-axis component command voltage value (Vqs) to the inverter 60.

The q-axis command voltage (Vqs) is defined as the following equation (4):

$$Vqs=(Rs \times Iqs)+(We \times Ls \times Ids) \qquad (4)$$

wherein Vqs is a q-axis command voltage value, Ls is a leakage reactance value of the stator, We is an angular velocity, Rs is a stator resistance value of the motor, Iqs is a value of actual q-axis component current flowing on the motor, and Ids is a value of actual d-axis component current flowing on the motor.

In equation (4), multiplication of We, Ls, Ids is called a reverse electrical generation force (Eq), that is, Eq=We×Ls×Ids.

Accordingly, the present invention is proposed by taking notice of the fact that the q-axis command voltage (Vqs) can be controlled by controlling the reverse electrical generation force (Eq) which is varied to affect the torque of the motor, especially, the magnetic flux component current.

From this point of view, in the present invention, the value of the compensation voltage obtained by proportionally integrating the difference value between the predetermined reference magnetic flux component current value (Id_ref) and the actually measured magnetic flux component current value (Id_actual) is added to the q-axis command voltage, so that the magnetic flux component current, that is, the excitation current, can be constantly controlled without excess or shortage.

In addition, the stator voltage drop compensation voltage value obtained by integrating the measured actual torque component current value and the stator resistance value is added to the value of the compensation voltage obtained from proportional integrating to generate a torque component instructing voltage, which automatically becomes a torque boost voltage.

Moreover, since the magnetic flux is constantly controlled irrespective of the speed of the motor, a high torque can be generated even at an early stage of starting of the motor (that is, at the low speed).

The operation of the magnetic flux component command voltage generator 50 will now be described.

The first voltage generator 50-1 of the magnetic flux component command voltage generator 50 multiplies the predetermined and stored stator resistance value (Rs) by the value (Id_actual) of actual magnetic flux component current flowing on the motor 70 which has been obtained by converting the three phase current detected by the current transformer into two phase current through the three phase/two phase converter, and outputs the result value as a first voltage value.

At this time, the second voltage generator 50-2 of the magnetic flux component command voltage generator 50 receives the value (Iq_actual) of actual torque component current which has been obtained by converting the three phase current detected by the transformer into two phase current through the three phase/two phase converter, integrates the value (Iq_actual) to a value obtained by multiplying the angular velocity (We) and the leakage reactance (δLs) of the motor 70, and outputs the result value as a second voltage value.

The subtracter (50-3) subtracts the second voltage value outputted by the second voltage generator 50-2 from the first voltage value outputted by the first voltage generator 50-1, and outputs the result value as a magnetic flux component command voltage value (Vds) to the inverter 60.

The d-axis command voltage (Vds) is defined as the following equation (5):

$$Vds=(Rs \times Ids)-(We \times \delta Ls \times Iqs) \qquad (5)$$

wherein Vds is a d-axis voltage value, We is an radian frequency, Rs is a stator resistance value of the motor, Ids is a value of magnetic flux component current flowing on the motor, Iqs is a value of q-axis component current supplied to the motor, and δLs is a leakage reactance value of the motor.

The leakage reactance δLs can be represented by the following equation:

$$\delta Ls = Ls - \frac{Lm^2}{Lr}$$

wherein Ls is a stator reactance, Lm is a mutual reactance, and Lr is a rotor reactance. δLs is almost the same with sum of Lls and Llr, wherein Lls is a stator leakage reactance and Llr is a rotor leakage reactance.

The stator reactance (Ls), the mutual reactance (Lm) and the rotor reactance (Lr) are inherent characteristics of each motor and can be obtained by measurement and by well-known calculation formula.

Accordingly, by using the thusly obtained characteristic constant values, the formula $$\delta Ls = Ls - \frac{Lm^2}{Lr}$$

or the fact that δLs is almost the same with sum of Lls and Llr, the leakage reactance (δLs) is obtained and its result value is previously stored. Therefore, the second voltage generating unit 50-2 can calculate the second voltage value by multiplying the measured actual torque component current value (Iqs) by an angular velocity conversion value of the instructing frequency computed separately according to the formula We=2II F and the previously stored leakage reactance (δLs).

In equation (5), the radian frequency (We) can be omitted and the magnetic flux component command voltage can be obtained by using formula of Vds=(Rs×Ids)−(δLs×Iqs). At this time, the second voltage generator 50-2 multiplies the measured actual torque component current value (Iqs) only by the previously stored leakage reactance (δLs) and outputs the result value as a second voltage value. As a matter of course, at this time, the subtracter 50-3 subtracts the second voltage value from the first voltage value outputted by the first voltage generator 50-1 and outputs the result value as a magnetic flux component command voltage value (Vds).

Thereafter, the inverter 60 receives the q-axis command voltage, that is, the torque component command voltage value (Vqs), and the d-axis command voltage, that is, the magnetic flux component command voltage value (Vds), pulse-width modulates them to control switching of the switching means, thereby controlling the motor 70.

As so far described, the motor torque control apparatus and method of the present invention has many advantages.

That is, first, by adding the value of the compensation voltage which is obtained by proportionally integrating a difference value between the predetermined reference magnetic flux component current value (Id_ref) and the actually measured magnetic flux component current value (Id_actual) to the q-axis instructing voltage, the magnetic flux component current, that is, the excitation current, can be constantly controlled without excess or shortage.

Second, the stator voltage drop compensation voltage value which is obtained by integrating the measured actual torque component current value and the stator resistance value to the value of the compensation voltage obtained from proportional integrating is automatically added to the command frequency-to-voltage converted voltage, to thereby generate the torque component command voltage which automatically becomes the torque boost.

Third, since the magnetic flux is constantly controlled irrespective of the speed of the motor, a high torque can be generated even at the initial stage of starting of the motor (at the low speed). Therefore, the torque of the motor can be smoothly controlled in every operation range from a low speed to a high speed.

Lastly, the motor is controlled in parallel by separating the voltage command to the magnetic flux component and the torque component by vector, so that a torque vibration due to the magnetic flux vibration at the early stage of starting of the motor can be prevented. Thus, the motor can be easily started even when a big load is applied.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A motor torque control apparatus comprising:
    a frequency-to-voltage converter for converting a command frequency to a voltage value according to a predetermined rated voltage-to-rated frequency ratio of a motor and outputting the voltage value;
    a magnetic flux controller for outputting a compensation voltage to compensate a difference between a predetermined reference value of a magnetic flux component current and a measured actual magnetic flux component current value;
    a stator voltage drop computing means for receiving the measured actual torque component current value, for computing a compensating voltage to compensate a voltage drop by the stator resistance of the motor and for outputting the compensating voltage;
    an adder for summing output values of the magnetic flux controller, of the frequency-to-voltage converter and of the stator voltage drop computing means and outputting the summed value as a torque component command voltage;
    a magnetic flux component command voltage generator for receiving the value of the measured actual magnetic flux component current and the value of the actual torque component current, computing and outputting a magnetic flux component command voltage; and
    an inverter for controlling the motor according to the torque component command voltage received from the adder and the magnetic flux component command voltage received from the magnetic flux component command voltage generator.

2. The apparatus of claim 1, wherein the magnetic flux controller comprises:
    a subtracter for obtaining a difference between the value of actual magnetic flux component current supplied to the motor and a value of predetermined reference magnetic flux component current; and
    a proportional integration controller for proportionally integrating the difference value received from the subtracter and outputting a compensation voltage to make the actual magnetic flux component current and the reference magnetic flux component current to be the same.

3. The apparatus of claim 1, wherein the magnetic flux component command voltage generator comprises:

a first voltage generator for receiving the value of actual magnetic flux component current, multiplying a predetermined stator resistance value to the value of actual magnetic flux component current, and generating and outputting a first voltage;

a second voltage generator for receiving the value of actual torque component current, multiplying the value of actual torque component current by a value obtained by multiplying an angular velocity and a leakage reactance of the motor, and generating and outputting a second voltage; and a subtracter for subtracting the second voltage value outputted from the second voltage generator from the first voltage value outputted from the first voltage generator, and outputting the result value as a magnetic flux component command voltage value.

4. A motor torque control method comprising the steps of:

measuring a value of actual magnetic flux component current flowing on a motor;

generating a compensation voltage for compensating a difference value between the measured actual magnetic flux component current value and a predetermined reference magnetic flux component current value;

converting a command frequency into a corresponding voltage according to a ratio between a rated frequency and a rated voltage of the motor;

computing a voltage drop value according to a stator resistance of the motor by multiplying a stator resistance value of the motor by a measured actual torque component current value;

summing a value of compensation voltage of the difference value, a value of voltage converted from the command frequency, and the voltage drop value, and generating a torque component command voltage value;

generating a magnetic flux component command voltage value on the basis of the measured value of actual torque component current flowing on the motor, the measured value of actual magnetic flux component current flowing on the motor, the stator resistance value, an angular velocity obtained by multiplying the command frequency by $2\pi$ and a leakage reactance value of the motor; and controlling a torque of the motor according to the torque component command voltage value and the magnetic flux component command voltage value.

5. The method of claim 4, wherein the step of generating a compensation voltage comprises:

computing the difference value between the measured value of actual magnetic flux component current value flowing on the motor and the predetermined reference magnetic flux component current value; and proportionally integrating the computed difference value and generating a compensation voltage to make the value of current supplied to the motor and the predetermined reference magnetic flux component current value to be the same to each other.

6. The method of claim 4, wherein the step of generating a magnetic flux component instructing voltage value comprises:

generating a first voltage by multiplying the measured value of actual magnetic flux component current flowing on the motor and the stator resistance value;

generating a second voltage by multiplying the measured actual torque component current value, a radian frequency obtained by multiplying the command frequency by $2\pi$, and the leakage reactance value of the motor, and subtracting the second voltage value from the first voltage value and generating a voltage corresponding to the subtracted voltage value as the magnetic flux component command voltage value.

* * * * *

UNITED STATES PATENT AND TRADEMARK OFFICE
CERTIFICATE OF CORRECTION

PATENT NO.    : 6,828,744 B2
DATED         : December 7, 2004
INVENTOR(S)   : S. Na It is certified that error appears in the above-identified patent and that said Letters Patent is hereby corrected as shown below:

Column 12,
Line 33, "," should be -- ; --.

Signed and Sealed this

Sixteenth Day of August, 2005

JON W. DUDAS
*Director of the United States Patent and Trademark Office*